US006065350A

United States Patent [19]
Hill et al.

[11] Patent Number: 6,065,350
[45] Date of Patent: May 23, 2000

[54] FLOW MEASUREMENT SYSTEM WITH GUIDED SIGNAL LAUNCHED IN LOWEST MODE

[75] Inventors: James A. Hill, Haverhill; John P. Pell, Dedham, both of Mass.

[73] Assignee: Panametrics, Inc., Waltham, Mass.

[21] Appl. No.: 09/349,432

[22] Filed: Jul. 7, 1999

Related U.S. Application Data

[60] Provisional application No. 60/092,272, Jul. 10, 1998.
[51] Int. Cl.[7] .............................. G01F 1/66; G01D 21/00
[52] U.S. Cl. ........................................ 73/861.27; 73/866.5
[58] Field of Search ........................... 73/861.27, 861.28, 73/861.29, 861.31, 861.18, 866.5

[56] References Cited

U.S. PATENT DOCUMENTS

| | | | |
|---|---|---|---|
| 3,575,050 | 4/1971 | Lynnworth | 73/861.27 |
| 4,279,167 | 7/1981 | Erb et al. | 73/861.27 |
| 4,454,767 | 6/1984 | Shinkai et al. | 73/861.18 |
| 4,787,252 | 11/1988 | Jacobson et al. | 73/861 |
| 4,802,490 | 2/1989 | Johnston | 73/861.25 |
| 5,280,728 | 1/1994 | Sato et al. | 73/861.28 |
| 5,533,408 | 7/1996 | Oldenziel et al. | 73/861.18 |
| 5,546,813 | 8/1996 | Hastings et al. | 73/861.29 |

OTHER PUBLICATIONS

Philip M. Morse and K. Uno Ingard, "Theoretical Acoustics", Princeton University Press, (1986) 9.2 Higher Modes in Ducts, pp. 492–495.

*Primary Examiner*—William Oen
*Assistant Examiner*—Jagdish Patel
*Attorney, Agent, or Firm*—Nutter, McClennen & Fish, LLP

[57] ABSTRACT

A signal transducer mounts to a straight tube to measure the flow velocity of fluid flowing therein. The transducer operates at a frequency above cut-off allowing multiple modes to exist, and is mounted with a wedge of material having a sound speed less than the sound speed of the fluid, coupled to the conduit, and angled to launch a signal into the fluid at an acceptance angle that sends the lowest order mode acoustic signal axially through the fluid. Extraneous modes present at generally lesser magnitude convert to the desired mode, resulting in propagation of a coherent burst that is readily detected by a receiving transducer located further along the conduit. The wedge may be formed of hard plastic such as an acrylic, PVC or PEI having a shear wave velocity less than 1400 meters per second, and the launch geometry results in the attenuation, mode conversion or cancellation of higher mode signal energy components. The principal signal is strong and well defined, arriving in a window before any interfering signals. Upstream and downstream signals are thresholded, and processed to provide a flow measurement of high accuracy.

8 Claims, 3 Drawing Sheets

FLOW MEASUREMENT SYSTEM WITH GUIDED SIGNAL LAUNCHED IN LOWEST MODE

CROSS-REFERENCE TO RELATED APPLICATIONS

This application is related to U.S. Provisional Application Ser. No. 60/092,272, filed by the applicants on Jul. 10, 1998.

FIELD OF THE INVENTION

The present invention relates to fluid flow measurement using ultrasonic signals. Ultrasonic flow measurement has found wide application to modern process measurement and control systems. Measurements of this type are generally made by propagating an ultrasonic signal burst or in some instances a continuous wave signal through a fluid, detecting the signal after it has propagated, and processing the detected signal to determine a characteristic of the fluid or its flow. This may involve propagating one or more signals across the direction of flow, or may utilize special flow cells in which the fluid is constrained to flow along a straight path for all or a substantial portion of the distance between the sending and receiving transducers.

Axial path flow measurement systems of the foregoing type have generally required that either a custom flow cell or a specialized straight length of pipe be placed in the fluid path, or in a parallel fluid path having a defined flow relation to the principal path. Such an axial path cell necessarily includes turns or bends, and often has corners or regions of dead flow where contaminants may build up.

In the semiconductor processing industry and in certain high purity fluid process applications such as pharmaceutical or food industry processing, supply or metering pump conduits must be designed for handling multiple successive fluids without contamination, and require frequent straight-through flushing. This necessitates fluid pathways with essentially no joints, corners, and having neither inwardly-nor outwardly-protruding features along the flow surface. In a conventional axial flow cell having right angle inlet and outlet, there is generally a certain amount of flow conditioning, and timing correction for dead space or no flow space near the transducer for which certain processing compensation is necessary in order to obtain meaningful measurements. In the ultra pure fluids situations described above, while such plumbing anomalies are not present, the constraint of having a straight-through flushing geometry would seem to rule out positioning of transducers in a manner effective to create an axial interrogation path. This appears particularly true for ultra pure fluids flowing in small conduits having an inner diameter in the range of about five to twenty five millimeters, where cross-conduit reflections may be expected to introduce substantial amounts of signal energy in regions unrelated to the desired axial flow interrogation path. The technical situation is further complicated by the fact that much measurement instrumentation is designed for attachment to metal tanks or conduits. The polymer tubes and pipes necessary for deionized water and other high purity fluids possess quite different acoustic properties, and their small size greatly increases the difficulty of suitably applying interrogation signals and separating interfering signals propagated along the wall or transducer from the desired fluid signals.

A major complication in any measurement system is that the ultrasonic signal must be launched through the conduit wall, and therefore generally enters the flowing fluid along a direction transverse to the flow. It is generally arranged that the signal path direction in the fluid has a component in the flow direction and another component which travels across the conduit to reach the receiving transducer. When longer pathways are necessary to resolve flow velocity better, it is possible to arrange the transducers so that one, two, or multiple reflections occur before a receiving transducer picks up the signal. However in those cases, the transducer spacing must be arranged with some knowledge of the signal timing, and the echoes which will be present so as to receive the appropriate echo from which path length information and velocity can be calculated. The axial path flow cells mentioned above allow a longer interaction with flow to achieve better flow velocity resolution, but because of their inlet/outlet geometry would not be adaptable to high-purity piping. It has also been proposed to perform axial path measurements by operating with a frequency below the cut-off frequency for the conduit in question—that is, using an ultrasonic or sonic signal such that only the lowest order mode of the signal will propagate along the conduit in the fluid. This effectively avoids the presence of multiple echoes and later arriving modes in the received signal, and provides a well defined straight path along the flow direction. However, the cut-off frequency for a water-filled pipe of, for example, ten millimeters diameter is approximately 75 kilohertz, and a frequency this low does not allow very good resolution of signal timing. For larger diameter pipes the cut-off frequency is even lower. Moreover, applicant is not aware of any system of this type applicable to such high purity fluid systems.

It would therefore be desirable to provide an axial path flow measurement system of improved characteristics.

SUMMARY OF THE INVENTION

This is achieved in accordance with one embodiment of the present invention by providing a signal transducer mountable to a smoothly contoured flow tube to measure a characteristic such as the flow velocity of fluid flowing therein. The transducer operates at a frequency above cut-off of the tube allowing multiple modes to exist, and the transducer is mounted with a wedge of material having a sound speed less than the sound speed of the fluid, and is angled to launch a signal into the fluid at an acceptance angle that sends the lowest order mode acoustic signal axially along the conduit. Extraneous modes present at generally lesser magnitude convert to the desired mode, resulting in propagation of a coherent burst that is readily detected by a receiving transducer located further along the conduit. The transducer is constructed so a vertically polarized shear wave passes through a wedge and through the tube wall, into the fluid, with the wedge being mounted at an angle such that the launch angle in the fluid is larger than the wedge angle. The launch angle is selected to be within a range of a critical angle between about 60 degrees and below 90 degrees and preferably about 75 to 80 degrees. In general, the signal frequency is selected such that the wave length in the fluid is greater than about one tenth of a pipe diameter and is preferably about one eighth to one third of a pipe diameter. Furthermore the receiving transducer has a size on the order of a wave length in the wedge material. In a prototype embodiment, the device operates with a signal burst of four cycles at a frequency of one megahertz for launching and receiving an axial path signal at the lowest order mode in a continuous pipe, such as a ten millimeter OD conduit. The transmitting transducer generates a vertically polarized shear wave, launching it into a hard plastic wedge such as an acrylic, PVC or PEI wedge having a shear wave velocity less than about 1400 meters per second. The wave is coupled through a body or medium such as a silicone rubber sheet into a conduit, the wall of which has a comparable sound speed, and the signal energy passes through the conduit wall into the fluid as a burst of longitudinal waves with a Gaussian envelope. At the receiving end, a comparable crystal and wedge pick up the first arriving signal through the pipe wall, which is a reconverted shear wave signal at the frequency of interest. The pipe itself is a non-metallic polymer material such as PFA, PVDF, PTFE or PVC, and the launching geometry results in the attenuation, mode conversion or cancellation of higher mode signal energy components inside the pipe cavity, so that the principal signal is strong and well defined, arriving in a window before any interfering signals. Preferably a zero crossing detector determines timing of the received signal from the transmitted signal, and the upstream and downstream signals are processed to provide a transit time differential measurement of high accuracy.

BRIEF DESCRIPTION OF THE DRAWINGS

These and other features of the invention will be understood by reference to the description below together with the figures of illustrative drawings herein, wherein.

DETAILED DESCRIPTION OF THE DRAWINGS

Figure 1:
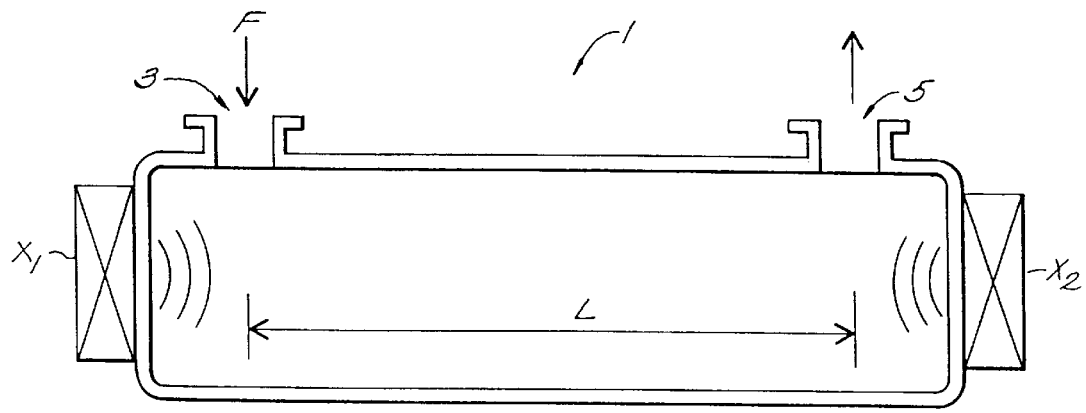
FIG. 1 shows a prior art axial path flow cell measurement system.

FIG. 1 illustrates a prior art axial path flow measurement system 1 for comparison and general technical background. The system 1 is a flow cell having an inlet 3 and outlet 5 positioned in a generally elongated body 7 of which a portion of length L defines a straight path for fluid flow. Transducers X1 and X2 are positioned at the end of the body so that they propagate a signal which travels for most of its length along the straight portion. As illustrated the transducers are spaced outside of the actual flow path, but are either in the fluid or along a path normal to the fluid so that the signals they transduce enter or exit the flowing fluid without refraction and travel along a path which is primarily influenced by the flow velocity in the section L. However, certain flow irregularities and turbulence occur in the initial region close to the ends near the transducer, and these will generally require corrections to the timing of signal processing in order to arrive at a corrected transit time.

Figure 2A:
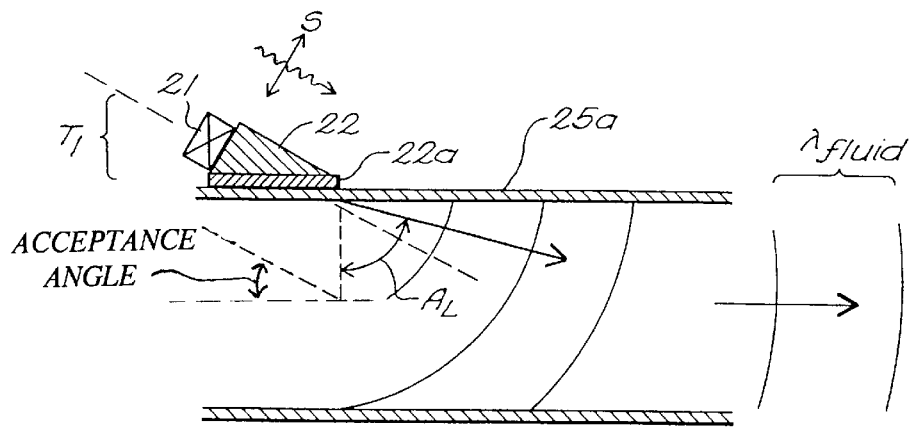
FIGS. 2A and 2B illustrate transmission and receiving transducers in the system of FIG. 2.
Figure 2B:
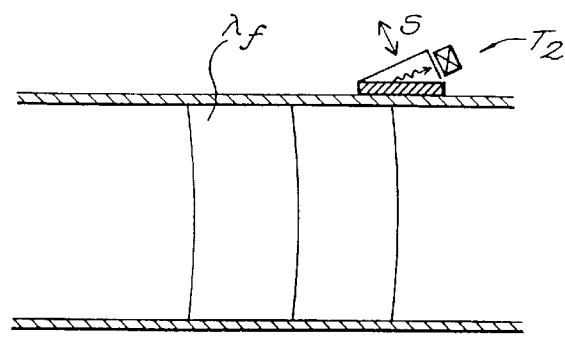
Figure 2:
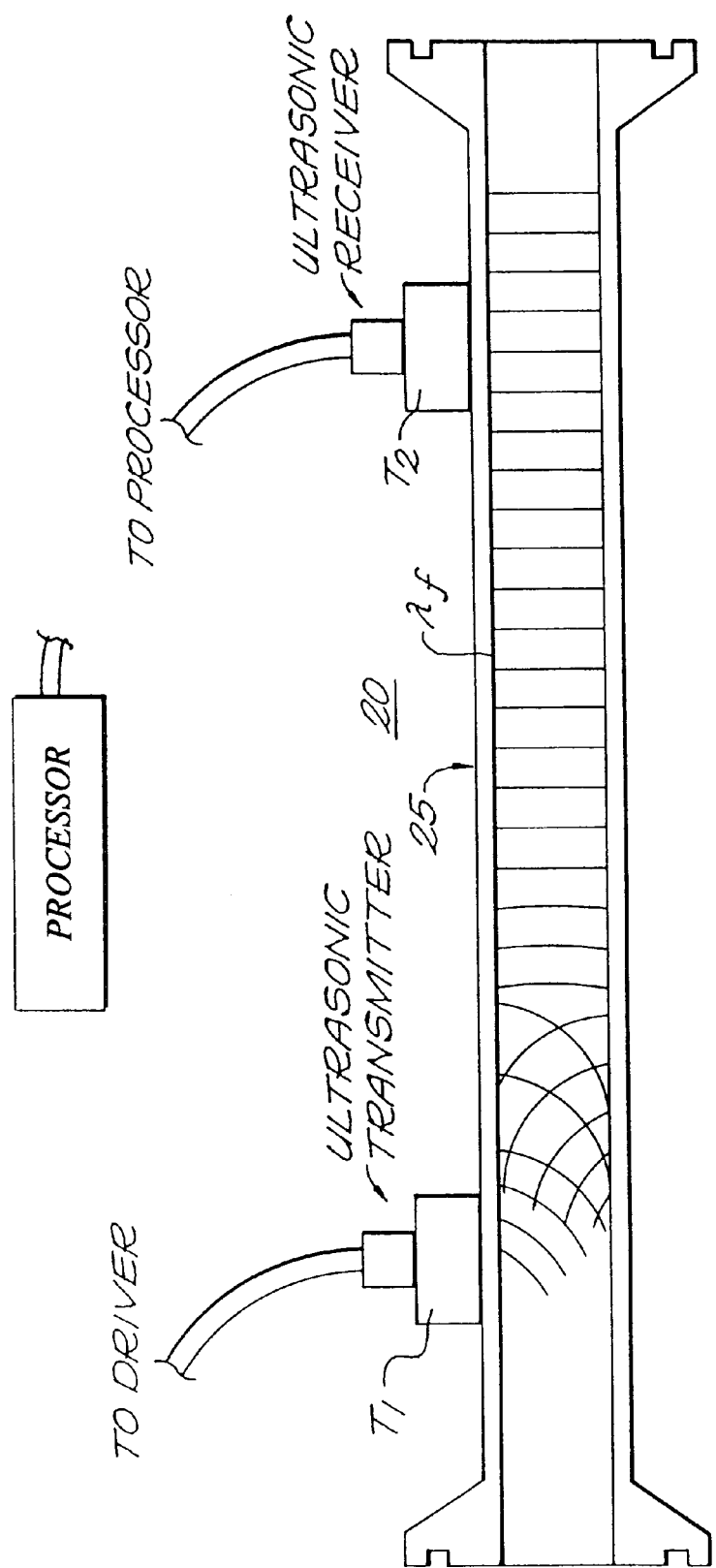
FIG. 2 shows an axial measurement system of the present invention for ultra pure liquids.
Figure 3A:
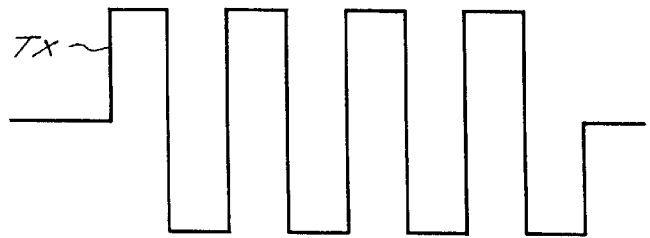
FIG. 3 illustrate signals of the measurement system.
Figure 3B:
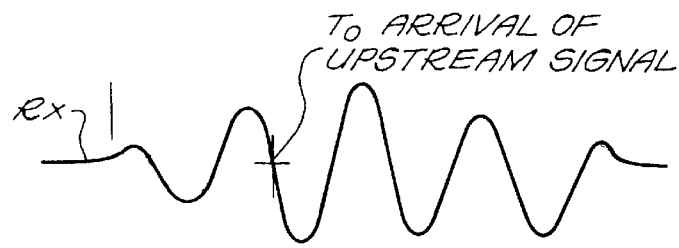
Figure 3C:
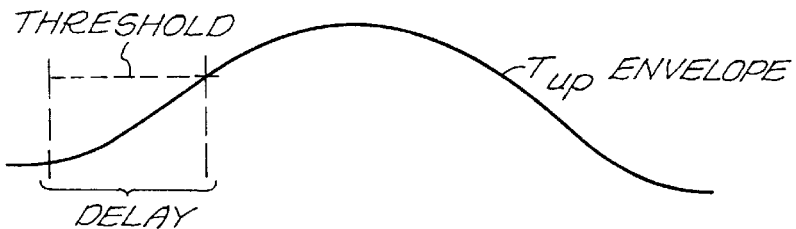
Figure 3D:
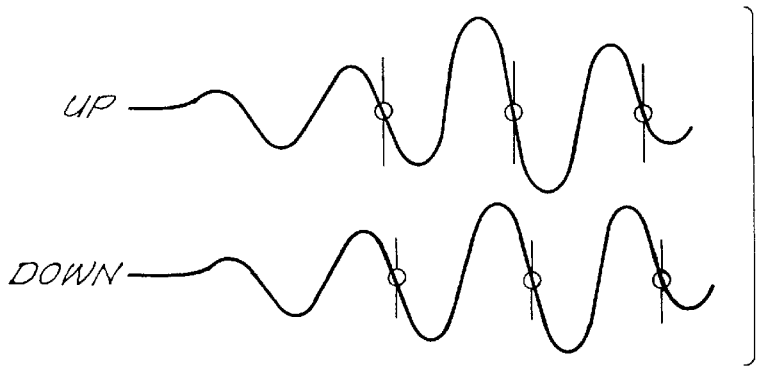

The present invention by contrast contemplates a flow conduit similar to that shown in FIG. 2, which is free of dead space, corners and the other features typical of inlet or entry ports of the type shown in FIG. 1. Thus, rather than a specialized flow cell the present invention contemplates operation in a conduit of which the principal features are simply a tubular shape defining a flow path. As will be clear from the discussion below the transducers in a system of the present invention therefore attach to a pre-existing conduit and are in that sense analogous to a number of clamp-on or snap-on transducer blocks or wedge mounting arrangements which have in the past been used for process situations in which the provision of a specialized flow cell is not economical or is not readily feasible.

FIG. 2 illustrates a basic embodiment 20 of one system of the present invention. As shown therein, a transducer T1 includes a crystal 21 and a wedge 22 having properties discussed further below, which generate and conduct a shear wave along an angle with respect to the conduit defined by the wedge. The conduit 25 is a straight conduit such as is used for carrying high purity liquids. For example, in a semiconductor processing context it may be a polymer conduit used to carry deionized water or other process or treatment fluid without leaching ions into the water. (Such straight conduits are also employed to carry corrosive fluid with abrasive particles in wafer polishing lines, where the plumbing configuration cannot allow the polishing slurry to settle or where the particles might otherwise collect in the bends of a conventional flow meter. Similarly difficult measurement geometries may occur in systems for handling or delivering slurries, emulsions, or biological or pharmaceutical material). It will be appreciated by those skilled in the art that accessing or detecting flow in this conduit presents a different set of constraints than normally encountered in for example, a petroleum or chemical process environment, where large steel pipes having a high sound speed surround defined fluids generally flowing at different velocity, pressure and temperature conditions, but possessing a slower sound speed. In those situations, many measurement system exist which rely on transmitting an ultrasonic signal through the wall of the pipe into the fluid flowing inside the pipe. By way of example, in systems of the present invention, the conduit 25 may be formed of PFA, PVC, PTFE or PVDF and have a sound speed or shear wave velocity of approximately 1400 meters per second.

FIG. 2A illustrates in greater detail the geometry of signal transmission at the transducer and pipe T1, 25. As shown, the crystal 21 is cut and energized so as to generate a vertically polarized shear wave having particle motion indicated by the arrow S which is transverse to the direction of propagation in the wedge 22. A suitable wedge may, for example, be a 42° wedge. This signal is transmitted into the wall 25a of the pipe 25 primarily as a vertically polarized shear wave without substantial change in its path. While some mode conversion may occur, this results in a longitudinal wave which, although it may propagate along the pipe wall, is essentially trapped, and of low magnitude, so that it does not reconvert or complicate the signal which enters and is guided in the fluid itself. The principal portion of the signal received through wedge 22 enters the fluid along a launch angle AL which is a relatively shallow angle with respect to the conduit axis and direction of flow. By way of example, the angle of launch, measured from the normal to the pipe wall, may be between 60° and 80° for fluids having a sound speed between 1615 and 1370 meters per second, and is preferably about 75° to 80°. The material of wedge 22 is selected to have a low sound speed, i.e., a sound speed for shear waves at the frequency employed which is comparable or approximately equal to that of the pipe wall 25, and has a wedge angle effective to refract, when launched into the given fluid, at a shallow angle as described above. As further shown in FIG. 2, a thin sheet of coupling material 22a is provided between the wedge 22 and the pipe wall 25a to press the two into acoustic contact along a thin line parallel to the axis of the conduit. Thus, when dealing with particular fluids of very low to very high sound speed, it may be desirable to employ a different wedge angle. Preferably, however, the angle is selected so a single wedge is effective for a broad range of fluid sound speeds, over a range of temperatures.

With this arrangement, the vertically polarized shear wave traveling through the wedge 22 proceeds along substantially the same direction through the pipe wall 25 before refraction at the fluid interface. As shown, refraction results in a much larger angle (with respect to the normal at the pipe surface) so that the launch angle of the wave into the fluid is close to axial, approximately 75° to 80° from the normal. Thus a substantial component of the energy is directed as an axially guided wave through the fluid along the tube. A minor portion of the energy strikes the pipe wall and reflects resulting in a certain level of cancellation, so that the higher modes are quickly converted to the lower mode or otherwise attenuated. Since the axial mode wave is the fundamental mode, no mode re-conversion occurs and a strong signal is propagated along the axis of the conduit. As further pictorially shown in FIG. 2A, the wave length of the signal in the wedge 22 changes to a wave length in the fluid which is longer.

FIG. 2B illustrates the receiving transducer T2 of a system of the invention. As shown, transducer T2 is identical to T1, but faces in the opposite direction. Similarly the incoming guided wave in the fluid is picked up and converted to a vertically polarized shear wave that enters the crystal and forms an output signal at T2. As shown in FIG. 2B, the wavelength is comparable to or larger than the length of the receiving wedge, so that the transducer can resolve incoming signals at the frequency $f$. In a prototype embodiment, a four-cycle, square-wave drive pulse of eighty volts amplitude and a frequency of one MHz was used to excite a piezoelectric crystal. This drive signal is indicated by TX in panel (a) of FIG. 3.

FIG. 3 illustrates signals in the prototype embodiment for determining transit time information. As shown in panel (b) of FIG. 3, the received signal, RX, has the same frequency as the transmitted signal, TX, but is of lower magnitude. Unlike TX, the received signal builds slowly to a maximum, and then trails off. This caused largely by the inability of the conduit to conduct a signal with a wide bandwidth. The slow rise time may lead to an ambiguity in the arrival time of the pulse. This may be addressed by calculating or calibrating a correction factor into each system to account for the delay between the actual start of the pulse and the instant at which the amplitude exceeds a threshold. In the signal processing of prototype system, shown schematically in panels (c) and (d) of FIG. 3, a transit time measurement is obtained by a processor which amplifies and digitizes the received signals in both the up and down stream directions. These signals are shown in panel (d). For both the signals, the amplitude envelope is calculated and the point where each signal exceeds a preset threshold A is found and is taken as the arrival time. The timing of the zero-crossing immediately after this point is recorded, and the upstream and downstream signals are aligned at their respective zero crossings. A cross-correlation processor then determines a small correction to the difference in upstream and downstream transit times, using cross-correlation. One embodiment of cross-correlation is described in U.S. Pat. No. 4,787,252 of Saul Jacobson, James Korba and Lawrence Lynnworth. This correlation processing allows the resolution of time differences much shorter than the digital sampling rate. Other forms of signal processing and comparison may be used, such as weighting and comparing a plurality of zero crossings of the two contrapropagated signals.

Typically, since the lowest mode propagating axially along the conduit lumen is also the fastest signal, the processor need only sample the received signal in a narrow time window at a known interval following transmitter actuation, and only the first detected signal burst need be processed. As noted above, the launching of the axial path interrogation signal, and the substantial suppression of other signal energy modes in the conduit resulting from the large refraction angle and small conduit size, thus provides a strong and clear axially-propagated flow interrogation signal, despite the straight and featureless geometry and small size of the flow conduit. In prototype embodiments of this system, applicant has achieved accurate flow rate measurements of water flowing in a three-eighths inch OD plastic conduit over a flow range between ten gallons per minute and one gallon per hour. Thus the system is broadly applicable to a range of fluids and flow conditions in processes including food, pharmaceutical and chemical processing or formulation, semiconductor process fluid handling and control, and other applications where the applications preclude turns, joints or dead space in the flow conduit or meter.

The invention being thus disclosed, variations and modifications thereof will occur to those skilled in the art, and all such variations and modifications are considered to be within the scope of the invention, as defined above and in the claims appended hereto.

What is claimed is:

1. An ultrasonic measurement system for measuring flow of a fluid in a conduit, such system comprising:

a transmitting transducer for generating a vertically polarized shear wave signal at a frequency $f$ above cut off;

a wedge coupling the transmitting transducer to the conduit, said transmitting transducer propagates said signal into the wedge, and said wedge formed of a material having a sound speed below about 1400 m/sec and being comparable to sound speed of a material of said conduit, said wedge is angled to launch said signal at a launch angle into said fluid;

a receiving transducer spaced along the conduit from the transmitting transducer and coupled to the conduit to receive a lowest order acoustic wave signal after propagation through the fluid in the conduit and producing a received signal indicative thereof; and a processor in communication with the receiving transducer to determine a transit time interval from the received signal;

wherein the wedge is configured such that the launch angle lies within an acceptance angle of said conduit effective to propagate the signal in said fluid axially along the conduit as the lowest order mode acoustic wave signal guided along the conduit as a strong signal without mode re-converting.

2. A measurement system according to claim 1, wherein the processor performs a correlation of zero crossing time to determine said transit time interval.

3. A measurement system according to claim 1, wherein the system further includes a body of coupling material for coupling the wedge to the conduit.

4. A measurement system according to claim 1, wherein said launch angle lies between 60 and 90 degrees with respect to a line normal to a wall of the conduit.

5. A measurement system according to claim 4, wherein said launch angle is about 75–80 degrees with respect to a line normal to a wall of the conduit.

6. A measurement system according to claim 4, wherein said launch angle is set to launch said lowest order mode acoustic wave signal as said launch angle changes with a temperature of the fluid.

7. A measurement system according to claim 1, wherein the wedge is configured to launch the lowest order mode acoustic wave signal into a fluid selected from among a high purity liquid, a biological liquid, a pharmaceutical liquid, an emulsion, a slurry, a suspension and an abrasive preparation.

8. An ultrasonic transducer assembly for measurement of fluid in a straight conduit having an axis, wherein the conduit is formed of a material having a characteristic sound speed, such assembly comprising:

a transducer element and a wedge coupled to the transducer element for applying the signal to the conduit, wherein the transducer element is configured to generate a vertically polarized shear wave signal at a frequency $f$ above cut off, and said wedge is formed of a material having a sound speed substantially matched to said characteristic sound speed of said conduit, and said wedge is configured to attach to a straight section of the conduit and is angled to launch said signal through a wall of the conduit and into the fluid when acoustically coupled to the conduit, the launch angle lying within an acceptance angle of the conduit such that the signal propagates substantially as a lowest order mode acoustic wave signal in the fluid along the axis of the conduit, wherein said signal travels with shortest transit time in the fluid as a guided wave to a receiving position spaced along the conduit and provides a clear indication of fluid flow.

* * * * *